UNITED STATES PATENT OFFICE.

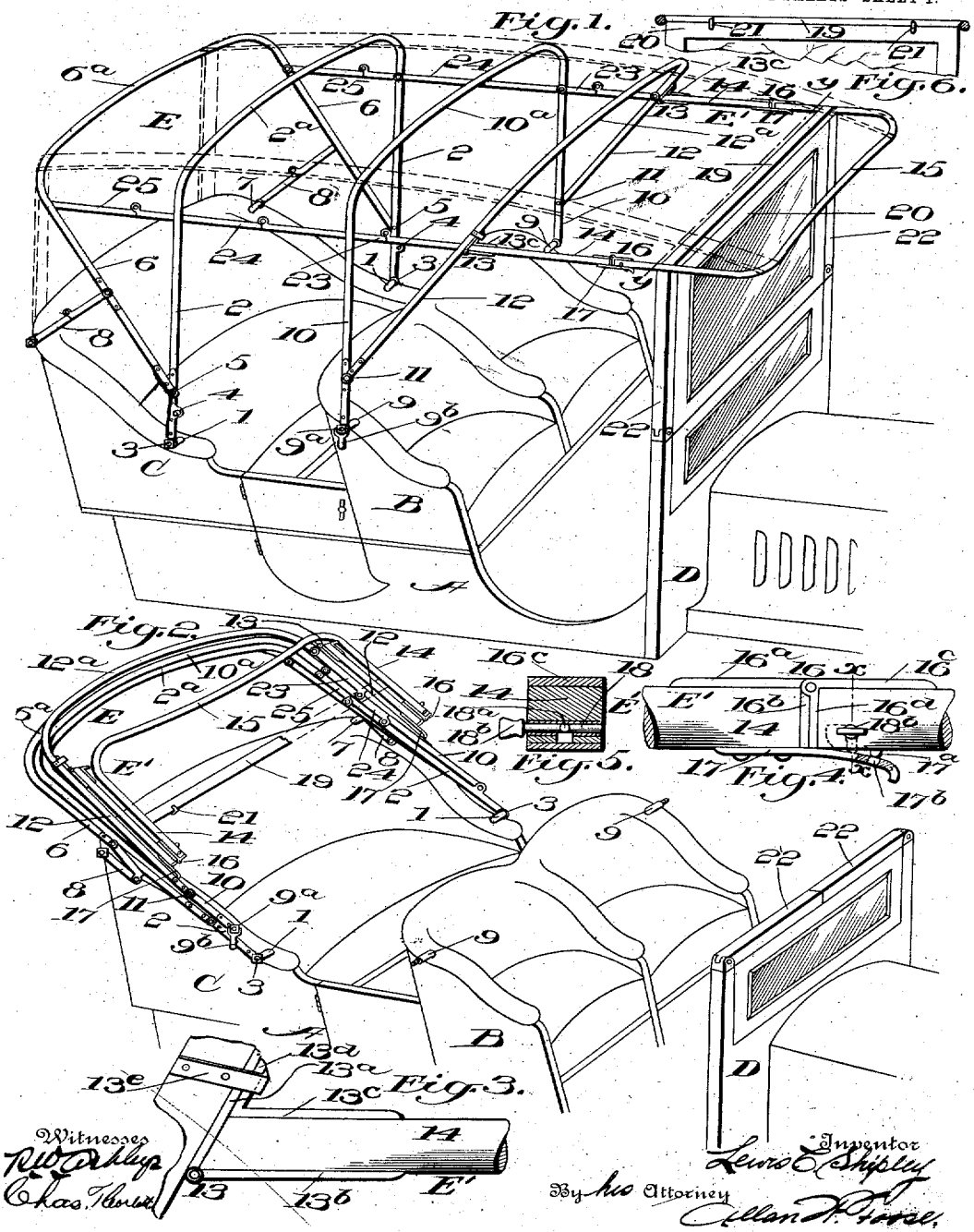

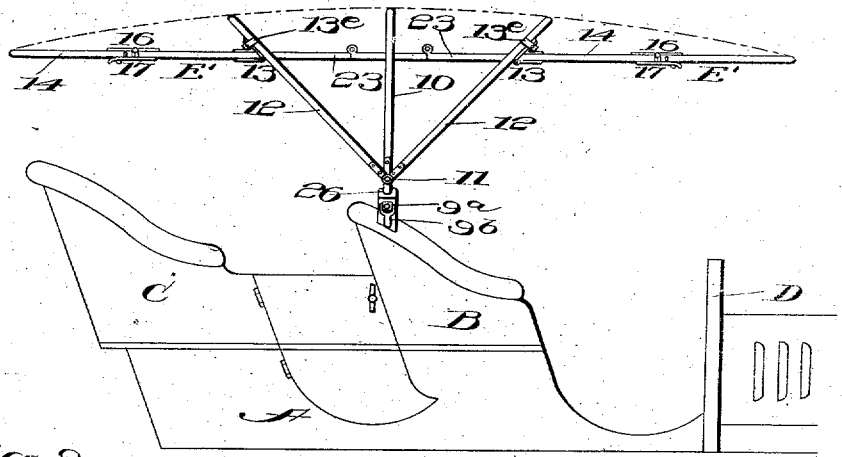
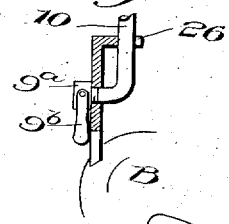
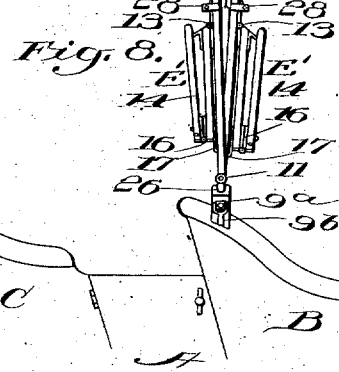

LEWIS C. SHIPLEY, OF NEW YORK, N. Y.

AUTOMOBILE EXTENSION CANOPY-FRAME.

No. 822,634.　　　Specification of Letters Patent.　　　Patented June 5, 1906.

Application filed February 6, 1906. Serial No. 244,301.

*To all whom it may concern:*

Be it known that I, LEWIS C. SHIPLEY, residing at New York, in the county of New York and State of New York, have invented certain new and useful Improvements in Automobile Extension Canopy-Frames, of which the following is a full, clear, and exact description, such as will enable others skilled in the art to which it appertains to make and use the same.

This invention relates to canopy-frames for automobiles.

The broad object of my invention is to produce a frame which can be extended over the seats and front glass-frame of an automobile without obstructing the entranceway and which can be easily set up in position when so desired and accordingly folded up and dropped back out of the way when not in use.

Another object is to provide means for preventing the woodwork from wearing at the pivots and at points where the greatest strain is.

Other objects will appear from the following description.

Figure 1 is a perspective view showing the two seats and glass-frame of an automobile with the frame open and extending over the same. Fig. 2 is also a perspective view showing the frame folded and the sash let down with its guides folded over the top thereof. Fig. 3 is a detail view of one of the hinges connecting the forwardly-extending frame to the front diagonal braces. Fig. 4 is a detail of one of the hinges at the point where the frame breaks when folded, showing the locking means therefor and the means for unlocking the same. Fig. 5 is a detail section of the unlocking means, taken on the line $xx$ of Fig. 4. Fig. 6 is a detail cross-section taken on the line $yy$ of Fig. 1, showing the means for fastening the frame to the front glass-frame. Fig. 7 is a view showing a modification of the frame. Fig. 8 is a view of the same, showing the frame in a folded position. Fig. 9 is a detail section of the support for holding the frame.

Similar reference characters refer to similar parts throughout the several views.

The part marked A on the drawings represents the body of an automobile. B is the front seat, and C is the rear seat thereof.

D is the dashboard or front part of the automobile.

E represents the canopy-frame as a whole, and E' represents the forwardly-extending frame, which projects over the front seat and the glass-frame of the front part.

Referring now to the frame, the parts marked 1 are the supports, preferably made of metal, which are secured to the rear seat on each side thereof. 2 represents standards pivoted at 3, extending upwardly and transversely at $2^a$ thereof, connecting with each other, said portion $2^a$ being curved. Each of these standards is provided with a stud 4 near the lower end thereof. Pivotally connected to these standards 2, as at 5, is a diagonal brace consisting of the side members 6 and the arched transverse member $6^a$. 7 represents supports secured to the rear seat. Pivoted to these supports and to the diagonal brace is another brace 8. 9 represents supports secured to the front seat, which are provided with screw-threaded ends. 10 represents standards held on the supports 9 by the nuts $9^a$, which fit on the screw-threaded ends of the supports. These nuts are provided with weighted handles $9^b$, which hang downwardly and prevent the same from being jarred off. The standards 10 are connected by the curved member $10^a$ thereof. Pivoted to the standards 10, as at 11, is a diagonal brace consisting of the side members 12 and the arched transverse member $12^a$. Hinged to the members 12 of the diagonal brace, as at 13, is the extension-frame E', previously mentioned, which consists of the forwardly-extending arms 14 and the transversely-extending portion 15 thereof. The two leaves $13^a$ and $13^b$ of the hinges 13 are secured to the diagonal members 12 and to the under side and rear end of the frame E', respectively. Secured also at the ends of the frame E', but on top thereof, is a plate $13^c$, which is bent upwardly, as at $13^d$, at an angle to conform to the angle of the leaf $13^a$ of the hinge. This bent part $13^d$ is arranged so as to bear against the leaf $13^a$ of the hinge when the frame is set up for use, which prevents the wood structure from wearing at this point, where there is a great strain. Catches $13^e$ may be used to hold the parts more rigid. The frame E' is provided with another hinge 16, which consists of four leaves $16^a$, $16^b$, $16^c$, and $16^d$. The leaves $16^a$ and $16^c$ are fastened to the top edge, while the leaves $16^b$ and $16^d$ cover the ends of the frame and are adapted to bear one against the other, thereby protecting the frame from wear. At the point where the frame E' is broken when folded I have provided a locking means comprising a spring-plate 17, secured to the under side and at the forward end of the rear portion of the frame, and a pin 17ª, secured to the under side and rearward end of the front portion, which fits in a hole 17ᵇ in the plate 17, as clearly shown in Fig. 4 of the drawings. I have also provided an unlocking means which is mounted in the frame E' near the plate 17. This unlocking means consists of a small shaft 18, upon which is mounted a lug 18ª, which engages the plate 17, forcing the same away from the pin. The shaft 18 is provided with a knob 18ᵇ, which is turned when desired to unlock the frame. 19 represents a bar fast to the frame E' and extending transversely thereof. 20 represents a frame of glass, which slides between guides 22, pivoted to the dashboard D, into which the frame 20 may be lowered. These guides are so pivoted as to fold inwardly when the frame is let down and lie on top of the same, as clearly shown in Fig. 2 of the drawings. The bar 19 is so arranged as to lie over the guides 22 and the frame 20 to hold these parts in position with the assistance of any suitable fastening means, as shown at 21. 23 represents braces, each of which is pivoted at its forward end to the upper part of the diagonal brace 12. The rear end of these braces are pivoted to the upper part of the standard 10. 24 and 25 are other braces extending between the standards 10 and 2 and between the braces 6 and the standards 2, respectively. All of these braces 23, 24, and 25 are provided with pivots which admit the same to be folded.

Suppose the frame is set up in the position shown in Fig. 1 and it is desired to fold and restore it to the position shown in Fig. 2. The bar 19 is first released from the frame 20 and guides 22 and the glass is lowered into pockets provided for that purpose. The guides 22 are then folded into the position shown in Fig. 2. The locking-plates 17 are then released, and the frame E' is broken at the hinges 16 and folded against the braces 12. The braces 23 are then broken and the brace 12 is folded against the frame 10. The nuts 9ª are then taken off the ends of the standards 10, the braces 24 are folded, and the standards 10 are carried over and fastened to the standards 2 by means of the parts 11 fitting over the studs 4 and the nuts 9ª screwed on said studs. The braces 8 and 25 are then folded, and all of the parts are brought to the position shown in Fig. 2.

In Fig. 7 I have shown a modification in which the part of the frame covering the rear part is exactly the same as the frame E'. In this embodiment the entire frame is supported on the front seat by the support. These supports consist of a flat piece of metal bent inwardly at right angles and secured to the body portion of the seat. The upper ends of these supports are provided with slots 26. These supports are also provided with holes. The standards 10 are turned outwardly at right angles and are screw-threaded at their ends. These outwardly-turned ends pass through the holes, the body of the supports fitting in the slots 26. The standards are held firmly on the supports by the nuts 9ª fitting on the screw-threaded ends of said standards. The frames E' are held firmly in position by catches 28, fastening the hinges 13, as shown in the drawings. Suppose this modified frame is raised, as shown at Fig. 7, and it is desired to fold it. The locking means 17 and the catches 28 are released. The frames E' are broken at the hinges 16 and then folded. The braces 23 are then folded, and the parts are brought to the position shown in Fig. 8.

As many changes could be made in the above construction and many apparently widely different embodiments of my invention could be made without departing from the scope thereof—for instance, the frame E' could be hinged directly to the standards 10 instead of being hinged to the diagonal braces 12 or the frame E' could also be hinged to ordinary canopy-frames which do not extend far enough—I intend that all matter contained in the above description or shown in the accompanying drawings shall be interpreted as illustrative and not in a limiting sense. I desire it also to be understood that the language used in the following claims is intended to cover all of the generic and specific features of the invention herein described and all statements of the scope of the invention which as a matter of language might be said to fall therebetween.

Having described my invention, what I claim as new, and desire to secure by Letters Patent, is—

1. In an automobile extension-canopy, an extension-frame, a main frame, a hinge, said hinge being attached to said main frame and to the end of said extension-frame, a plate attached at the end and on top of said extension-frame, said plate being bent at an angle to conform to the angle of one leaf of said hinge and adapted to bear against said leaf, a catch adapted to engage said bent portion of said plate and to hold the same, as and for the purpose set forth.

2. In an automobile extension canopy-frame, an extension made in two parts, a hinge near the center thereof, said hinge consisting of four leaves, two of said leaves being attached to the ends of said frame where the two parts are joined, the other two leaves covering the ends of the frame, said leaves adapted to bear one against the other when the frame is extended as and for the purpose set forth.

3. In an automobile extension-canopy, a frame made in two parts, a joint, said joint being provided with a locking means, said locking means being provided with an unlocking means, said unlocking means comprising a lug adapted to engage the spring-plate of the locking means, said lug being mounted upon a shaft, said shaft having a knob thereon; as and for the purpose set forth.

4. In an automobile-canopy, a main frame, an extension-frame, said extension-frame being hinged to said main frame, said extension-frame having a bar extending transversely thereof, guides between which a frame of glass slides, said extension-frame adapted to lie over said guides and said frame of glass, and a fastening means to hold these parts together when the frame is set up in position substantially as described.

5. In an automobile canopy-frame, a main frame, an extension-frame hinged to said main frame, said extension-frame extending forwardly substantially horizontally from said main frame, said extension-frame being composed of three members, the forward member being hinged to the rearward members, said forward member adapted to swing upwardly, said rearward members adapted to swing downwardly and lie against said main frame, and said forward member adapted to lie against said rearward members, when the frame is collapsed.

In testimony whereof I affix my signature in the presence of two witnesses.

LEWIS C. SHIPLEY.

Witnesses:
ALLAN W. FOOSE,
EMIL HRONESH.

DISCLAIMER.

822,634.—*Lewis C. Shipley*, New York, N. Y. AUTOMOBILE EXTENSION CANOPY-FRAME. Patent dated June 5, 1906. Disclaimer filed June 13, 1914, by the assignee, *Douglas E. Bonner*.

Enters his disclaimer—

"As to so much of lines 88 to 93 of page 2 of the specification as reads as follows: "* * * for instance, the frame E' could be hinged directly to the standards 10 instead of being hinged to the diagonal braces 12 or the frame E' could also be hinged to ordinary canopy-frames which do not extend far enough * * *" and as to claim five (5) of every main frame in the combination of elements therein contained, except a main frame which projects diagonally in the manner of the "diagonal brace" described in the specification.

[*Official Gazette, June 23, 1914.*]

locking means being provided with an unlocking means, said unlocking means comprising a lug adapted to engage the spring-plate of the locking means, said lug being mounted upon a shaft, said shaft having a knob thereon; as and for the purpose set forth.

4. In an automobile-canopy, a main frame, an extension-frame, said extension-frame being hinged to said main frame, said extension-frame having a bar extending transversely thereof, guides between which a frame of glass slides, said extension-frame adapted to lie over said guides and said frame of glass, and a fastening means to hold these parts together when the frame is set up in position substantially as described.

5. In an automobile canopy-frame, a main frame, an extension-frame hinged to said main frame, said extension-frame extending forwardly substantially horizontally from said main frame, said extension-frame being composed of three members, the forward member being hinged to the rearward members, said forward member adapted to swing upwardly, said rearward members adapted to swing downwardly and lie against said main frame, and said forward member adapted to lie against said rearward members, when the frame is collapsed.

In testimony whereof I affix my signature in the presence of two witnesses.

LEWIS C. SHIPLEY.

Witnesses:
ALLAN W. FOOSE,
EMIL HRONESH.

DISCLAIMER.

822,634.—*Lewis C. Shipley*, New York, N. Y. AUTOMOBILE EXTENSION CANOPY-FRAME. Patent dated June 5, 1906. Disclaimer filed June 13, 1914, by the assignee, *Douglas E. Bonner*.

Enters his disclaimer—

"As to so much of lines 88 to 93 of page 2 of the specification as reads as follows: "* * * for instance, the frame E' could be hinged directly to the standards 10 instead of being hinged to the diagonal braces 12 or the frame E' could also be hinged to ordinary canopy-frames which do not extend far enough * * *" and as to claim five (5) of every main frame in the combination of elements therein contained, except a main frame which projects diagonally in the manner of the "diagonal brace" described in the specification.

[*Official Gazette, June 23, 1914.*]

DISCLAIMER.

822,634.—*Lewis C. Shipley*, New York, N. Y. AUTOMOBILE EXTENSION CANOPY-FRAME. Patent dated June 5, 1906. Disclaimer filed June 13, 1914, by the assignee, *Douglas E. Bonner.*

Enters his disclaimer—

"As to so much of lines 88 to 93 of page 2 of the specification as reads as follows:

"* * * for instance, the frame E' could be hinged directly to the standards 10 instead of being hinged to the diagonal braces 12 or the frame E' could also be hinged to ordinary canopy-frames which do not extend far enough * * *"

and as to claim five (5) of every main frame in the combination of elements therein contained, except a main frame which projects diagonally in the manner of the "diagonal brace" described in the specification.

[*Official Gazette, June 23, 1914.*]